Feb. 8, 1938.                    E. A. DICKEY                    2,107,564
HYDRAULIC BRAKE
Filed Feb. 14, 1935
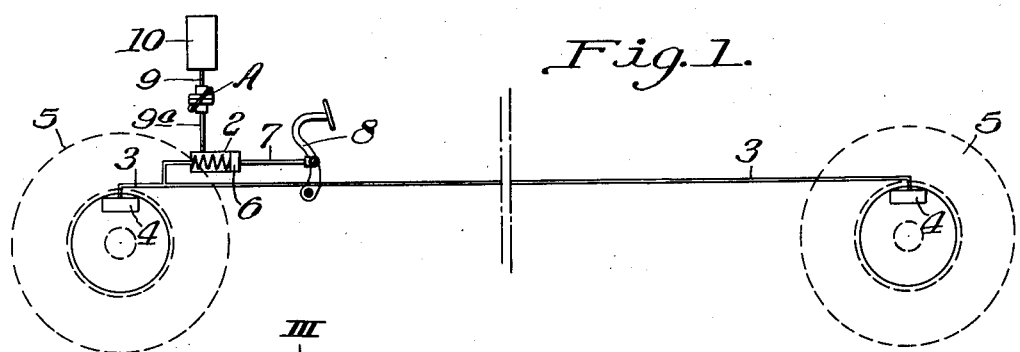
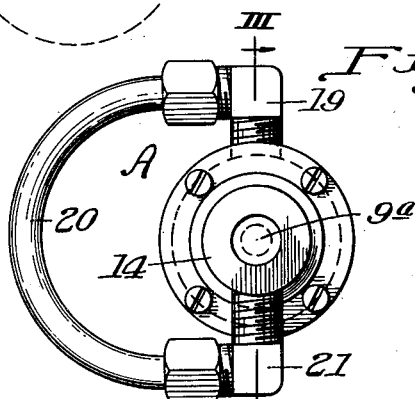
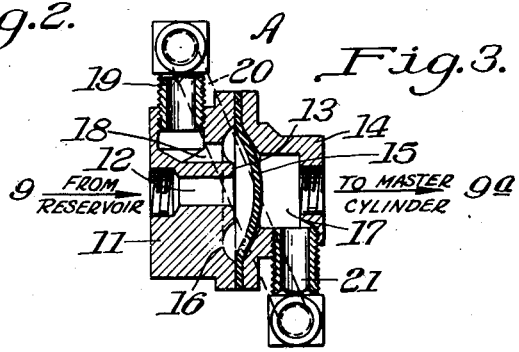
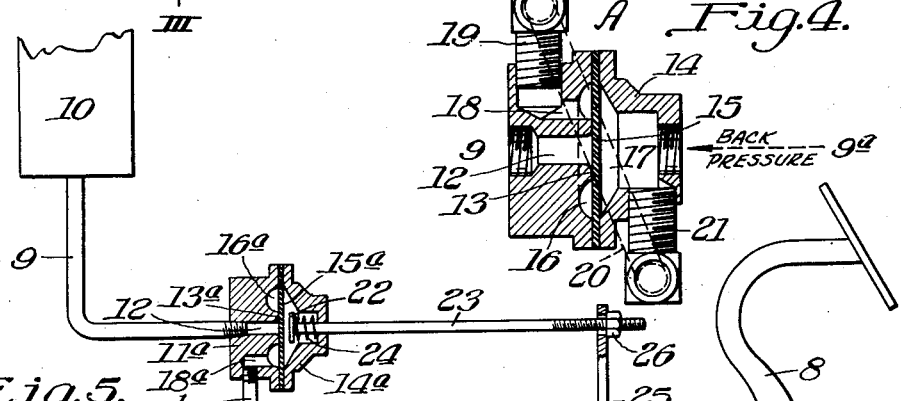
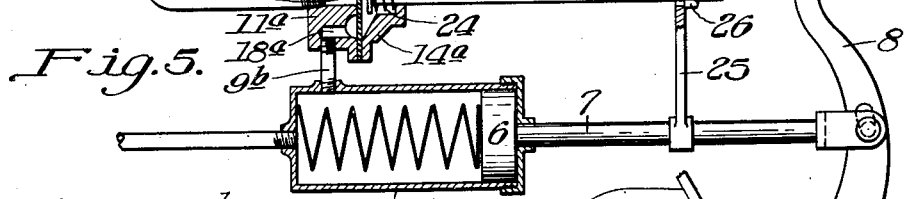
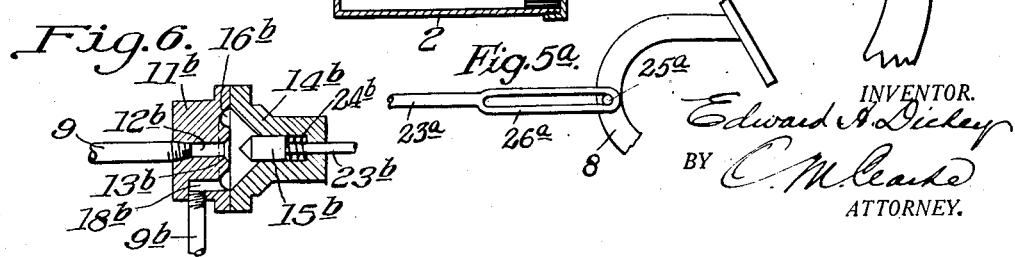
INVENTOR.
Edward A. Dickey
BY C. M. Clarke
ATTORNEY.

Patented Feb. 8, 1938

2,107,564

UNITED STATES PATENT OFFICE 2,107,564

HYDRAULIC BRAKE

Edward A. Dickey, Aliquippa, Pa.

Application February 14, 1935, Serial No. 6,514

1 Claim. (Cl. 60—54.6)

This invention is an improvement in means for maintaining a maximum normal content of liquid in a hydraulic brake system and preventing diminution of the liquid by back pressure.

In such systems, utilizing a master cylinder and equalizing pressure connections with the several individual wheel brakes, any loss or diminution of liquid is normally compensated for by supplemental supply to the cylinder or conduit line by any suitable means, as a reservoir. However, when braking pressure is applied, the normal body of liquid in the cylinder and conduits may be reduced by back pressure sufficiently to materially reduce or retard prompt and effective braking pressure, unless such back pressure reverse flow of the liquid towards the reservoir is promptly and positively prevented.

In my invention I have provided such means in the form of a control valve capable of ensuring a free and ample supply at all times to maintain the full necessary quantum of liquid in the system, while promptly sealing against undesirable back pressure return flow when the brakes are applied.

Certain preferred embodiments of the invention are shown in the accompanying drawing, in which:

Fig. 1 is a somewhat diagrammatic view in side elevation showing the application of the invention to a motor driven vehicle;

Fig. 2 is a view of my improved valve in end elevation;

Fig. 3 is a cross section on the line III—III of Fig. 2, illustrating circulation from the supply source to the master cylinder;

Fig. 4 is a similar view illustrating closure of circulation by back pressure from the system;

Fig. 5 is a sectional view, similar to Fig. 1, showing a modified construction;

Fig. 5a is a partial view like Fig. 5 showing an alternative connection between the treadle lever and valve rod;

Fig. 6 is a sectional view showing a further modified construction.

Referring to the drawing, 2 is the master cylinder of a hydraulic pressure transmitting system of conduits 3 leading to the several brake actuating elements 4 of a motor driven vehicle, having the usual wheel members 5. Cylinder 2 is provided with the conventional plunger 6 connected by rod 7 with the brake lever or treadle 8 for application of simultaneous braking action.

Cylinder 2 is maintained normally full of liquid by supply line 9—9a leading from reservoir 10 through valve A, adapted to provide for free open feed circulation when plunger 6 is retracted, and to promptly close against back pressure when the plunger is advanced for pressure application.

Valve A is in effect a check valve, so constructed as to remain normally open or capable of opening, for free cylinder supply and to instantly close against back pressure when the contents of the system are under pressure.

To this end it consists of a head 11 provided with a circulating port 12 leading from valve seat 13 through conduit 9 to reservoir 10, and an opposite head 14 having a conduit 9a connected with the master cylinder 2 or any of the system conduits 3.

In the constructions shown in Figs. 1 to 4 inclusive, a flexible diaphragm 15 of rubber or the like, is clamped between heads 11 and 14, normally closing seat 13, subject to back pressure seating through conduit 9a. Head 11 is provided with an annular circulation clearance opening 16 around seat 13, and head 14 is provided with clearance opening cavity 17 communicating with connection 9a.

Feed circulation to the cylinder and piping system from reservoir 10 is maintained by pipe 9, port 12, unseating of diaphragm 15 as in Fig. 3, annular clearance 16 and port 18 of head 11 to a nipple fitting 19 of a by-pass loop conduit 20 to nipple fitting 21 communicating through opening 17 at the other side of the diaphragm with the master cylinder connection 9a.

The flexibility of the diaphragm easily admits seepage flow to renew any diminution of full normal content of liquid in the system, and instantly closes against reverse circulation therefrom back to the reservoir upon braking application, as in Fig. 4.

I show in Fig. 5 a modified construction in which the diaphragm 15a is positively seated by the terminal 22 of a thrust rod 23 and spring 24. Said rod is normally retracted by arm 25 slidably engaging rod 23 forwardly and on back movement engaging adjustable abutment 26 just sufficiently to allow for diaphragm deflection and pressure circulation from the reservoir around seat 13a, annular clearance 16a and port 18a by pipe 9b to cylinder 2. In such construction the supply circulation is through head 11a only, subject to closure by positive mechanical seating of the diaphragm by released action of rod 23 and spring 24. This is effected simultaneously with application of braking pressure by such or any suitable means for positively seating the diaphragm in synchronism with brake liquid pressure. When thus seated by terminal 22 of rod 23 of the plunger rod 7, arm 25 slidably engaging rod 23 on release, upon engaging abutment 26 slightly retracts rod 23 admitting reservoir pressure to cylinder 2 and promptly releases the rod on the next brake application, promptly seating the diaphragm.

Rod 23 may also be connected with treadle lever 8 by a suitable intervening lost motion clevis link compensation, or other operative mechanism may be utilized adapted to ensure prompt seating of the diaphragm to cut off reverse circulation on the generation of initial braking pressure.

One such arrangement is shown in Fig. 5a showing rod 23a provided with a link 26a engaging pin 25a of lever 8, in which forward motion of lever 8 allows spring 24 to seat terminal 15b.

I show also in Fig. 6 a further modified construction in which valve head 11b is like 11a but provided with a globe valve seat 13b and a cooperating valve 15b, operable in the same general manner as above described, the parts being similarly numbered, with the exponent b.

Ordinarily the circulation of the liquid will be positively controlled by the means described, entirely independent of any variation in volume due to temperature changes. This is because any expansion or contraction of the liquid at opposite sides of the valve will be equalized and will not affect the operation.

It will be understood also that the valve may be utilized variously in adapting it to different conditions, as may arise, and is not limited to the specific application herein presented.

With either form of valve, the prevention of back pressure leakage is positively avoided and prompt brake application is ensured. The construction is highly efficient, simple and economical in manufacture and use, and capable of long continued operation without getting out of order.

What I claim is:

In braking apparatus, in combination with a piping system and a pressure exerting master cylinder communicating therewith having a piston and actuating means therefor, a supply reservoir, a chambered valve casing having conduit connection with the reservoir and the master cylinder, an opening and closing diaphragm valve therein subject to static pressure of the reservoir adapted to establish circulation to the master cylinder when open and to discontinue circulation thereto when closed, an arm connected with the piston actuating means, a valve closing abutment having a stem extending through the valve casing slidably engaging the arm and provided with a retracting abutment at one side thereof to effect opening of the valve when the piston is in retracted position, and resilient means held under compression by the arm and retracting abutment permitting the valve to open when the piston is retracted and whereby release of such compression provides for reverse movement of the valve closing abutment and closing of the valve upon reverse movement of the piston-actuating means upon applying braking pressure.

EDWARD A. DICKEY.